United States Patent [19]

Moy

[11] Patent Number: 5,573,812

[45] Date of Patent: *Nov. 12, 1996

[54] MULTI-LAYER COATING COMPOSITION INCORPORATING MIGRATORY CATALYST

[75] Inventor: Wynn Moy, Orland Park, Ill.

[73] Assignee: The Sherwin-Williams Company, Cleveland, Ohio

[*] Notice: The portion of the term of this patent subsequent to Nov. 24, 2013, has been disclaimed.

[21] Appl. No.: 483,652

[22] Filed: Jun. 7, 1995

Related U.S. Application Data

[62] Division of Ser. No. 157,585, Nov. 24, 1993, abandoned.

[51] Int. Cl.$^6$ ........................................ B05D 7/14
[52] U.S. Cl. ............................ 427/333; 427/409
[58] Field of Search .................... 427/333, 409

[56] References Cited

U.S. PATENT DOCUMENTS

| | | | |
|---|---|---|---|
| 4,254,168 | 3/1981 | Monson | 427/409 |
| 4,350,790 | 9/1982 | Chattha | 525/110 |
| 4,631,206 | 12/1986 | Mabuchi et al. | 427/340 |
| 4,891,248 | 1/1990 | Kraus | 427/340 |
| 4,917,955 | 4/1990 | Porter et al. | 428/413 |
| 4,944,803 | 7/1990 | Kraus | 106/203 |
| 5,225,248 | 7/1993 | Stephenson | 427/333 |

Primary Examiner—Michael Lusignan
Assistant Examiner—Erma Cameron
Attorney, Agent, or Firm—Steven W. Tan; Robert E. McDonald; Heidi A. Boehlefeld

[57] ABSTRACT

A multi-layer composite coating composition which comprises:

(a) a first coat which is substantially free of isocyanate functionality and which comprises:
  (i) a film-forming composition capable of curing or drying; and
  (ii) a catalyst for the reaction of isocyanate groups and active hydrogen groups;

(b) an intermediate coat which is not catalyzed by the catalyst in the first coat; and (c) a second coat which is applied to the surface of the intermediate coat prior to the complete curing of said first coat and said intermediate coat, wherein the second coat comprises:
  (i) an active hydrogen functional compound; and
  (ii) a polyisocyanate;
whereby upon the application of said second coat, the reaction between the polyisocyanate and the active hydrogen functional compound of the second coat is catalyzed.

7 Claims, No Drawings

MULTI-LAYER COATING COMPOSITION INCORPORATING MIGRATORY CATALYST

This is a divisional of application Ser. No. 08/157,585 filed on Nov. 24, 1993, abandoned.

BACKGROUND OF THE INVENTION

1. Field of the Invention

This invention relates to a multi-layer composite coating composition which comprises a first coat which incorporates a catalyst which is essentially inert in such first coat and a second coat which is applied onto the first coat, or, in the alternative, onto an intermediate coat which has been applied onto the first coat, which second coat then obtains use of the catalyst from the first coat through catalyst migration or permeation into the second coat. This invention is particularly useful in automotive coating applications which incorporate a colored basecoat followed by the application of a clearcoat prior to the cure of the basecoat itself.

2. Description of the Prior Art

The use of clearcoat and basecoat compositions is known in the art. For example, U.S. Pat. Nos. 4,871,806 and 4,912,154 teach the use of clearcoat/basecoat systems. Additionally, applications of migratory catalysts where the catalyst is incorporated in the clearcoat or topcoat are known in the art. For example, Kraus, U.S. Pat. No. 4,891,248, teaches a process for promoting the cure of a two-component polyurethane coating by applying to the polyurethane while it is in a wet or semi-dry state a composition consisting essentially of a hydroxy functional polymer and a catalyst for the reaction of hydroxyl groups and isocyanate groups.

Porter, et al., U.S. Pat. No. 4,917,955 teach clearcoat/basecoat systems wherein the basecoat is free of a cure catalyst and comprises a liquid crosslinkable composition comprising a polyepoxide and a polyacid and the clearcoat comprises a catalyst in an amount sufficient to cure both the basecoat and the clearcoat.

BRIEF SUMMARY OF THE INVENTION

This invention relates to multi-layer composite coating compositions which comprise:

(a) a first coat which is substantially free of isocyanate functionality and which comprises:

(i) a film-forming composition capable of curing or drying;

(ii) a catalyst for the reaction of isocyanate groups and active hydrogen groups; and (iii) optionally, a pigment;

(b) a second coat which is preferably substantially free of any catalyst for the reaction of isocyanate groups and active hydrogen groups, and which is applied to the surface of the first coat prior to the complete curing of said first coat, or, in the alternative, ms applied to the surface of an intermediate coat which has been applied to the surface of the first coat prior to the complete curing of said intermediate coat, wherein the second coat comprises:

(i) an active hydrogen functional compound; and (ii) a polyisocyanate;

whereby upon the application of said second coat onto the catalyst containing first coat or the intermediate coat, the reaction between the polyisocyanate and the active hydrogen functional compound of the second coat is catalyzed.

Additionally, this invention relates to a process for coating a substrate which comprises applying to the substrate the first coat of this invention, followed by the optional application of an intermediate coat prior to the complete curing of said first coat, followed by the application of the second coat of this invention prior to the complete curing of the first coat or intermediate coat.

This invention also relates to substrates coated with the composite coating taught herein.

One object of this invention is to provide a novel multi-layer composite coating composition.

Another object is to provide multi-layer composite coating compositions wherein the potlife of the second coat can be extended by incorporating the catalyst for the curing reaction of the second coat only in the first coat and allowing catalytic activity by migration or permeation of the catalyst between the two coating compositions.

Another object of this invention is to provide basecoat/clearcoat coating compositions particularly useful in automotive coatings applications.

Another object of this invention is to provide high solids coating compositions.

By "film-forming" is meant that the composition can form a film from evaporation of any carrier or solvent and/or by any curing reaction which takes place.

DETAILED DESCRIPTION OF THE INVENTION

Multi-layer and clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat.

The term "first coat" as used herein is a relative term which refers to the coating composition which is applied to the substrate prior in time to the "second coat". The first coat contains the catalyst for the reaction of active hydrogen functional compounds and isocyanate functional compounds. The "first coat" can be a primer coat which is designed to be coated with one or more additional coating layers, either pigmented or non-pigmented (such as a primer/topcoat, primer/basecoat or primer/basecoat/clearcoat configuration), or, the "first coat" can be a pigmented coating layer which is designed to be directly coated with an additional clear coating (such as a basecoat/clearcoat configuration). In view of the above, it should be appreciated that "first coat" is not necessarily the first coating applied to the substrate, but rather, can be either a primer coat or a basecoat. Likewise, it should be appreciated that the first coat need not be, although preferably is, pigmented. In a preferred embodiment, the first coat is a pigmented basecoat suitable for use in automotive coating applications under an unpigmented clearcoat.

The term "second coat" as used herein is a relative term which refers to a coating composition for use over the first coat. The second coat contains both an active hydrogen functional component and an isocyanate functional component, but lacks the catalyst used to catalyze the reaction between the two components. The second coat can be the pigmented basecoat (if the primer is the first coat), but is an unpigmented clearcoat (wherein the basecoat is the first coat) in a preferred embodiment. The second coat need not be applied directly over the first coat; rather, an intermediate coat can be applied over the first coat prior to the complete curing of the first coat. Provided that the second coat is also applied over the surface of the intermediate coat prior to the complete curing of the intermediate coat, the intermediate coat will not adversely inhibit the migration of the catalyst from the first coat to the second coat.

The first coat composition may be any of the polymers known to be useful in coating compositions including the polymers and/or diluent compositions of this invention. Either solvent based or water-reducible first and second coats can be used in combination with the materials of this invention.

One useful polymer first coat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic monomers for either type of polymer include methyl methacrylate, ethyl methacrylate, propyl methacrylate, butyl methacrylate, ethyl acrylate, butyl acrylate, acrylonitrile, acrylamide, etc.

Other ethylenically unsaturated monomers which can be copolymerized with the acrylic monomers include styrene, vinyl acetate and vinyl chloride. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc.

Other polymers useful in the first coat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the first coat include alkyd resins or polyesters which can be prepared in a known manner by the condensation of polyhydric alcohols and poly carboxylic acids, with or without the inclusion of natural drying oil fatty acids. The polyesters or alkyds may contain a proportion of free hydroxyl and/or carboxyl groups.

If desired, the first coat composition may also contain minor amounts of a cellulose ester, to alter the drying or viscosity characteristics of the first coat.

Typically, the first coat will include pigments and colorants conventionally used for coating compositions and after being applied to a substrate, which may or may not previously have been primed, the first coat will be allowed sufficient time to form a polymer film which will not be lifted during the application of the second coat. The second coat is then applied to the surface of the first coat, and the system can be allowed to dry or, if desired, can be force dried by baking the coated substrate at temperatures typically ranging up to about 250° F.

The first coat must contain a catalyst for the reaction of active hydrogen functional materials and isocyanate functional materials. Useful catalysts for the reaction of the isocyanate and active hydrogen functional materials include metal catalysts from metals such as bismuth, manganese, nickel, zinc, cobalt, calcium, zirconium, tin, copper, antimony, and others. Particularly useful catalysts of this type include zirconium octoate, cobalt octoate, calcium octoate, manganese octoate, bismuth octoate, bismuth neodecanate, nickel octoate, zinc octoate, zinc napthenate, cobalt neodecanate, dibutyltin dilaurate, dimethyltin dichloride, dibutyltin di-2-ethyl hexoate, tin octoate, tin chloride, antimony trichloride and antimony 2-ethyl hexoate. Although less effective, tertiary amines are also useful in the practice of this invention, generally as a cocatalyst in combination with other types of catalysts. Useful tertiary amines include N-methylimidazole, triethylamine, dimethylethanolamine, dimethyldicyclohexylamine, and others.

Particularly preferred catalysts include dibutyl tin dilaurate, tin octoate, dimethyltin dichloride, bismuth octoate and bismuth neodecanate.

The catalyst must be present in an amount sufficient to catalyze the reaction between the active hydrogen functional component and the isocyanate functional component of the second coat. Generally, the catalyst should be present in an amount of between about 0.1 percent by weight to about 10.0 percent by weight based upon the total weight of the first coat. In a preferred embodiment, the catalyst is present in an amount of between about 0.1 percent by weight to about 3.0 percent by weight based upon the total weight of the first coat.

The second coat composition may comprise any of the polymers known to be useful in coating compositions, such as those previously discussed as useful in the first coat compositions, and could include any of the polymers or coatings taught in this invention.

The second coat must contain an active hydrogen functional component. The term "active hydrogen" is meant to include those compositions having hydrogen atoms, which due to their position on the molecule, display activity according to the Zerewitinoff test. Accordingly, active hydrogens include hydrogen atoms attached to oxygen, nitrogen, or sulfur, and thus useful compounds will include those having these groups:

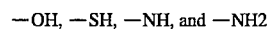

$$-\text{OH}, -\text{SH}, -\overset{|}{\text{NH}}, \text{ and } -\text{NH}_2$$

The moieties attached to each group can be aliphatic, aromatic, cycloaliphatic or of a mixed type not including carbonyl, phosphonyl or sulfonyl linkages.

Examples of such compounds include amines, which includes polyamines, aminoalcohols, mercapto-terminated derivatives, and alcohols, which includes polyhydroxy materials (polyols).

Preferred are materials having two or more active hydrogen functional groups per molecule.

Suitable amines are the primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other non-reactive groups can be present attached to the carbon atom, such as oxygen, sulfur, halogen or nitroso. Exemplary of suitable aliphatic and alicyclic diamines are the following: 1,2-ethylene diamine, 1,2-propylene diamine, 1,8-menthane diamine, isophorone diamine, propane-2,2-cyclohexyl amine, and methane-bis-(4-cyclohexyl amine). Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine, and p-aminodiphenylamine. Polynuclear aromatic diamines can be employed in which the aromatic rings are attached by means of a valence bond such as, for example, 4,4'-biphenyl diamine, methylene diamine and monochloromethylene dianiline.

Amino alcohols, mercapto-terminated derivatives and mixtures, and the like, hydroxy acids and amino acids can also be employed as the active hydrogen compounds. Examples are monoethanolamine, 4-aminobenzoic acid, aminopropionic acid, N-(hydroxyethyl) ethylene diamine, 4-hydroxybenzoic acid, p-aminophenol, dimethylol propionic acid, hydroxy stearic acid, and beta-hydroxypropionic acid. When amino acids are used, additional basic material should also be present to release NCO-reactive amines from Zwiterion complexes.

Particularly usefule polyols include low molecular weight diols, triols and higher alcohols, low molecular weight amide-containing polyols and higher polymeric polyols such as polyester polyols, polyether polyols and hydroxy-containing acrylic interpolymers. The low molecular weight diols, triols and higher alcohols are known in the art. They have hydroxy values of 200 or above, usually in the range of 200 to 1500. Such materials include aliphatic polyols, particularly alkylene polyols containing 2 to 18 carbon atoms. Examples include ethylene glycol, propylene glycol, 1,4-butanediol, 1,6-hexanediol, cycloaliphatic polyols such as 1,2-cyclohexanediol and cyclohexane dimethanol. Examples of triols and higher alcohols include trimethylol propane, glycerol and pentaerythritol. Also useful are polyols containing ether linkages such as diethylene glycol and triethylene glycol and oxyalkylated glycerol.

Also useful are the polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be used as indicated can be made, for instance, by oxyalkylation of compounds such as sucrose or sorbital.

Polyester polyols can also be uses as the polyol component. The polyester polyols are typically prepared by the polyesterification of organic polycarboxylic acids or anhydrides thereof with organic polyols. Usually the polycarboxylic acids and polyols are aliphatic or aromatic dibasic acids and diols.

Most preferred are polyester polyols, hydroxy functional cellulosics, acrylic polyols and alkylene polyols having from 2–18 carbon atoms.

The second coat must also contain an isocyanate functional material. Such materials are well known in the art and include the mono-, di-, tri- and multi-functional isocyanates. Di- and tri-functional isocyanates are most preferred.

Suitable isocyanate functional materials include aromatic, cycloaliphatic and aliphatic isocyanates such as cyclohexyl isocyanate, phenyl isocyanate, toluene isocyanate, hexamethylene diisocyanate, 4,4'-dicyclohexylmethane diisocyanate, 1,4-tetramethylene diisocyanate, 1,10-decamethylene diisocyanate, toluene-2,4- or 2,6-diisocyanate, 1,5-naphthalene diisocyanate, 4-methoxy-1,3-phenylene diisocyanate, 4-chloro-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4'-diisocyanatodiphenylether, benzidine diisocyanate, 4,4'-diisocyanatodibenzyl, methylene-bis(4-phenyl-isocyanate), 1,3-phenylene diisocyanate, 1,2,4-benzene triisocyanate and polymethylene polyphenyl isocyanate.

Most preferred are the adducts of hexamethylene diisocyanate, isophorone diisocyanate and tetramethyl xylene diisocyanate.

Typically, the second coat may contain ultraviolet light absorbers such as hindered phenols or hindered amines at a level ranging up to about 6% by weight of the vehicle solids as is well known in the art. The second coat can be applied by any application method known in the art, but preferably will be spray applied. If desired, multiple layers of first and/or second coat can be applied. Typically, both the first coat and the second coat will each be applied to give a dry film thickness of about 0.01 to about 6.0, and especially about 0.5 to about 3.0 mils.

The following examples have been selected to illustrate specific embodiments and practices of advantage to a more complete understanding of the invention. Unless otherwise stated, "parts" means parts-by-weight and "percent" is percent-by-weight.

EXAMPLE I—CATALYST IN BASECOAT ONLY

A colorant solution was prepared comprising a mixture of pigments and resins as follows:
Pigments:
  Yellow Iron Oxide
  Carbon Black
  Carbazole Violet
  Pthalocyanine Blue
  Aluminum Flake

| Resins: | |
|---|---|
| Cellulose Acetate Butyrate | |
| Melamine | |
| Polyester | (neopentyl glycol, trimethylol propane, adipic acid, phthalic acid/anhydride, isophthalic acid/anhydride, dimethyl terephthalate/terephthalic acid) |
| Modified Alkyd | (soya fatty acid, pentaerythritol, phthalic anhydride, methyl methacrylate, styrene and acrylonitrile) |
| Acrylic | (methyl methacrylate and butyl methacrylate) |
| Polyethylene Wax | |

This composition was reduced (1:1 wt. basis) with a solvent as follows:
  Ethyl Acetate (37.3 wt. %)
  Toluene (37.7 wt. %)
  Xylene (22.5 wt. %)
  Ethylene Vinyl Acetate Copolymer (2.5 wt. %)
to produce a basecoat solution. The basecoat solution was separated into twelve samples (numbered 1–12) to which differing levels of dibutyl tin dilaurate were added (see Table I).

TABLE I

| Can # | % Dibutyl Tin Dilaurate |
|---|---|
| 1 | 0.0 |
| 2 | 0.0 |
| 3 | 0.1 |
| 4 | 0.2 |
| 5 | 0.3 |
| 6 | 0.4 |
| 7 | 0.5 |
| 8 | 0.6 |
| 9 | 0.7 |
| 10 | 0.8 |
| 11 | 0.9 |
| 12 | 1.0 |

Twelve test panels were coated with a two-component acrylic polyol/hexamethylene diisocyanate prepolymer sealer. The sealer was allowed to dry for approximately 24 hours and was then scuff sanded with #7448 Scotch Brite® pad. The basecoats were applied over the sealer to a dry film thickness (dft) of approx. 1.0 mil. The basecoats were allowed to sit for 30 minutes prior to application of the clearcoat.

A clearcoat solution containing the ingredients of Table II was prepared. No catalyst was present in the composition.

TABLE II

| Component | Grams |
|---|---|
| Hydroxy Acrylic Solution | 54.80 |
| Xylene | 12.67 |
| Tinuvin 292 | 2.09 |
| Silicone Resin (Byk 300) | 0.35 |
| Acrylic Resin (Av 5-10) | 35.08 |
| Toluene | 38.26 |

The Table II solution was divided into twelve identical samples, of which two "control" solutions were made by adding 0.62 g (Control #1) and 1.24 g (Control #2) of dibutyl tin dilaurate. The ten remaining samples were not further modified (i.e. they contained no dibutyl tin dilaurate catalyst).

Just prior to application over the basecoats, both control solutions and all ten additional Table II solutions were reduced in a 4:2:1 ratio of Table II Solution:Reducer:Hardener to produce the clearcoats used herein. The reducer used was a solution of 58.4 wt. % xylene, 26.5 wt. % n-butyl acetate and 15.1 wt. % naptha (flash pt. 100). The hardener used was a solution of 74.4 wt. % hexamethylene diisocyanate adduct (Desmodur N 3390®) and 25.6 wt. % xylene. All clearcoats were spray applied from a siphon gun to a dry film thickness of approximately 1.5 mil.

The following combinations of basecoat/clearcoat were thus prepared:

TABLE III

| Basecoat Can # | DBTDL in Basecoat | Clearcoat Used and DBTDL in Clearcoat | |
|---|---|---|---|
| 1 | 0.0% | 0.62g | (Control #1) |
| 2 | 0.0 | 1.24 | (Control #2) |
| 3 | 0.1 | 0.00 | (Table II) |
| 4 | 0.2 | 0.00 | (Table II) |
| 5 | 0.3 | 0.00 | (Table II) |
| 6 | 0.4 | 0.00 | (Table II) |
| 7 | 0.5 | 0.00 | (Table II) |
| 8 | 0.6 | 0.00 | (Table II) |
| 9 | 0.7 | 0.00 | (Table II) |
| 10 | 0.8 | 0.00 | (Table II) |
| 11 | 0.9 | 0.00 | (Table II) |
| 12 | 1.0 | 0.00 | (Table II) |

TABLE IV

DRY TIMES FOR CLEARCOATS (in minutes) using 50 g Zapon Tack Tester

| Combination # | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 180 | 180 | 180 | 75 | 65 | 45 | 30 | 35 | 20 | 17 | 23 | 28 |

TABLE V

KOENIG PENDULUM HARDNESS*
1 Day, 1 Week, 2 Week, 4 Week

| | Combination # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1D | 11 | 12 | 15 | 15 | 14 | 13 | 11 | 12 | 12 | 13 | 12 | 12 |
| 1W | 20 | 20 | 27 | 20 | 20 | 20 | 17 | 18 | 18 | 18 | 16 | 16 |
| 2W | 21 | 21 | 27 | 22 | 21 | 22 | 20 | 19 | 20 | 20 | 18 | 17 |
| 4W | 23 | 24 | 29 | 24 | 23 | 24 | 22 | 21 | 22 | 22 | 20 | 19 |

*higher values indicate harder films

TABLE VI

20 DEGREE GLOSS/DISTINCTNESS OF IMAGE* AFTER ONE WEEK OF DRYING

| | Combination # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| GL | 87 | 86 | 88 | 86 | 88 | 87 | 89 | 88 | 86 | 86 | 86 | 86 |
| DOI | 85 | 87 | 85 | 79 | 82 | 81 | 84 | 79 | 80 | 72 | 74 | 79 |

*higher values indicate higher gloss or better distinctiveness of image

As can be seen from Tables IV through VI, clearcoat dry times can be dramatically reduced by incorporating catalyst for the reaction of isocyanates and active hydrogen containing materials in the basecoat composition. This is accomplished without sacrificing coating hardness, gloss or distinctness of image.

EXAMPLE II—CATALYST IN PRIMER

A. Primers (in parts by weight)

| | Control | Experimental Primer #1 | Experimental Primer #2 |
|---|---|---|---|
| Base Mat'l[a] | 100 | 100 | 100 |
| Reducer[b] | 50 | 50 | 50 |
| Catalyst #1[c] | — | 1 | — |
| Catalyst #2[d] | — | — | 7.7 |

[a]Commercially available primer Jet Seal® E2A28 from The Sherwin-Williams Company, an alkyd-based auto-oxidative primer (dehydrated castor oil, glycerol and phthalic acid) pigmented primarily with talc, titanium dioxide and calcium carbonate.
[b]Aliphatic and aromatic hydrocarbons.
[c]Commercially available dimethyl tin dichloride (Cotin® 210 from Cosan Chemical) prepared as a reduced solution of 1 gram dimethyl tin dichloride in 5 ml. methyl isobutyl ketone.
[d]Thirteen percent dibutyl tin dilaurate solution in toluene.

The primers were mixed according to the part by weight formulas shown above and applied at one coat and two coats over Bonderite® 1000 iron phosphate treated steel panels. The film thicknesses ran from approximately 0.38 mils–0.50 mils at one coat to approximately 0.85–1.00 mils for two coats. Coatings tested over each of the primers (Control, Exp.#1, Exp. #2) were as follows:

1. A proprietary hydroxy functional acrylic/polyisocyanate formulation which contained metal catalyst. Primers were allowed to dry for one hour prior to application of the coating.
2. Acrylyd® Plus autoxidizable polymer with aliphatic isocyanate crosslinker in a blue metallic color with zirconium catalyst. Primers were air dried for four hours prior to application of this coating.
3. Commercially available Ultrabase 7® enamel from The Sherwin-Williams Company (does not contain catalyst)

reduced 100 percent with reducing solvent, allowed to dry for two hours and followed by a clear coating comprising a mixture of hydroxy-functional acrylic and isocyanate-functional materials with dibutyl tin dilaurate catalyst present. All coatings were spray applied from a siphon gun.

The results of these coatings is shown below. There was no noticeable difference between the one coat or two coats of primer on the rate of cure. Tack free times (minutes) are as follows:

| RESULTS | | | |
|---|---|---|---|
| | Control | Experimental Primer #1 | Experimental Primer #2 |
| Proprietary acrylic/isocyanate | 360 | 200 | 100 |
| Acrylyd ® Plus autoxidizable/ isocyanate | ≧1080 | <180 | 108 |
| UltraBase 7 ® and Clearcoat | 265 | 265 | 110 |

As can be seen from the results, the addition of catalyst into the primer accelerates the cure of the isocyanate containing topcoat and, can even accelerate the cure of an isocyanate containing clearcoat which is applied onto the surface of a colored basecoat which does not have additional catalyst incorporated therein.

EXAMPLE III—METAL CATALYST IN BASECOAT

Commercially available Ultrabase 7® enamel from The Sherwin-Williams Company was separated into two samples and dibutyl tin dilaurate catalyst was added as follows:

| | Sample A | Sample B |
|---|---|---|
| Enamel | 100 g | 100 g |
| DBTDL (a) | — | 7.7 g |

(a) Dibutyl Tin Dilaurate catalyst (13% in toluene)

Samples were sprayed over primed tinplate panels. Less than two hours later, a clear coating comprising a mixture of hydroxy-functional acrylic and isocyanate-functional materials with dibutyl tin dilaurate catalyst present was sprayed over each Sample. The following results were obtained:

| | Sample A | Sample B |
|---|---|---|
| Dry to touch | 60 min | 30 min |
| Tack free time | 190 min | 65 min |
| Tape free time | 255 min | 170 min |

As can be seen from the above results, the addition of metal catalyst into the basecoat of a basecoat/clearcoat system accelerates the cure of the isocyanate containing clearcoat, even though the clearcoat already contains some catalyst.

EXAMPLE IV—WATERBORNE PRIMER

A waterborne primer-surfacer was prepared using Baybond® XP-7015E polyurethane dispersion (Mobay/Miles) and Arolon® vinyl acrylic emulsion (Air Products) as the primary binder materials. The material was separated into two samples (Solutions 1 and 2). A 10% dibutyl tin dilaurate in methyl ethyl ketone solution was prepared and added to Solution 1 (50 g Solution 1 and 5 g catalyst solution). 5 g of methyl ethyl ketone (no catalyst) were added to Solution 2. The two solutions were sprayed over treated Bonderite 1000 panels and allowed to air dry for 2 hours. Film thicknesses were 1.4 mils (Solution 1) and 1.6 mils (Solution 2).

A clearcoat solution based on a hydroxy-functional acrylic resin was prepared. For each 80 g of clearcoat solution, 10 g of Desmodur®N-851 isocyanate and 40 g of reducing solvent were added. The solution was split into two solutions (Solutions A and B). 1.1 g of an 8% solution of zinc naphthenate was added to Solution B.

Each of Solutions A and B were sprayed over Solutions 1 and 2 to film thicknesses of 0.8 mils. The following dry time results were obtained:

| Tack Free Times | Solution 1 | Solution 2 |
|---|---|---|
| Solution A | 30 min | 110 min |
| Solution B | 30 min | 90 min |

As can be seen from the above results, the incorporation of dibutyl tin dilaurate catalyst into a waterborne primer-surfacer can accelerate the cure rate of both an uncatalyzed isocyanate-containing topcoat and a catalyzed isocyanate-containing topcoat.

The invention claimed is:

1. A process for coating a substrate with a multi-layer decorative and/or protective coating which process comprises:
   (a) applying to the substrate at least one first coat which is substantially free of isocyanate functionality and which comprises:
      (i) a film-forming composition capable of curing or drying; and
      (ii) a catalyst for the reaction of isocyanate groups and active hydrogen groups; and
   (b) applying to the first coat, prior to the complete cure of said first coat an intermediate coat which is not catalyzed by the catalyst contained in said first coat; and
   (c) applying to the intermediate coat, prior to the complete cure of said intermediate coat a second coat which second coat comprises:
      (i) an active hydrogen functional compound; and
      (ii) a polyisocyanate;
whereby upon application of said second coat, a reaction between the polyisocyanate and the active hydrogen functional compound of the second coat is catalyzed.

2. The process of claim 1 wherein the catalyst for the reaction of isocyanate groups and active hydrogen groups is a metal compound.

3. The process of claim 2 wherein the metal is selected from the group consisting of tin, zinc, bismuth, manganese, and copper.

4. The process of claim 1 wherein the active hydrogen functional compound of the second coat is a hydroxy functional compound.

5. The process of claim 4 wherein the hydroxy functional compound is a hydroxy functional polymer.

6. The process of claim 5 wherein the hydroxy functional polymer is a hydroxy functional acrylic polymer.

7. The process of claim 5 wherein the hydroxy functional polymer is a hydroxy functional polyester.

* * * * *